No. 860,436. PATENTED JULY 16, 1907.
R. F. BARTEL.
CAST-OFF FOR SUSPENDERS.
APPLICATION FILED OCT. 8, 1906.
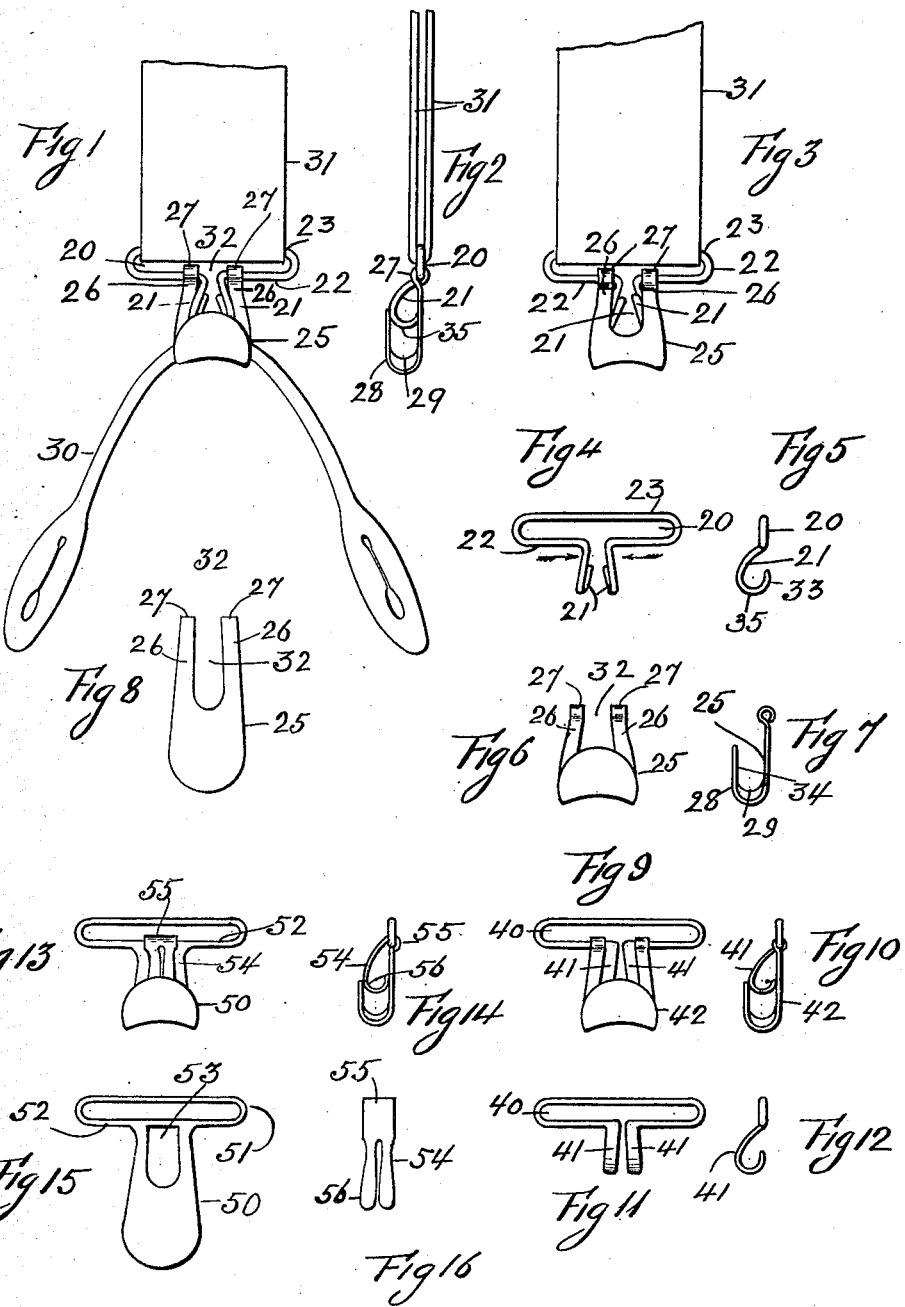

UNITED STATES PATENT OFFICE.

RUDOLPH F. BARTEL, OF BAYONNE, NEW JERSEY.

CAST-OFF FOR SUSPENDERS.

No. 860,436.  Specification of Letters Patent.  Patented July 16, 1907.

Application filed October 8, 1906. Serial No. 338,016.

*To all whom it may concern:*

Be it known that I, RUDOLPH F. BARTEL, a citizen of the United States, and a resident of Bayonne, in the county of Hudson and State of New Jersey, have invented certain new and useful Improvements in Cast-Offs for Suspenders, of which the following is a specification.

This invention relates to cast offs for suspenders, and its organization comprises an elongated loop with spring jaws coacting with a hook portion, so that the spring jaws can be forced through the said hook portion.

In the drawings Figure 1 represents an elevation of my improved suspender cast off with the webbing and strap of the suspender shown in place, Fig. 2 shows an end view of Fig. 1, Fig. 3 is a rear view of Fig. 1, Fig. 4 shows a front view of the elongated loop of Fig. 1, Fig. 5 is an end view of Fig. 4, Fig. 6 shows a front view of the hook portion of Fig. 1, Fig. 7 is an end view of Fig. 6, Fig. 8 shows the blank for forming the hook portion of Fig. 1, Fig. 9 shows a front elevation of a slight modification of Fig. 1, Fig. 10 is a side view of Fig. 9, Fig. 11 represents the elongated loop of Fig. 9, Fig. 12 is a side view of Fig. 11, Fig. 13 represents a front elevation of a further modification of Fig. 1, Fig. 14 shows a side view of Fig. 13, Fig. 15 represents the blank for making the hook portion of Fig. 13, Fig. 16 shows the blank for the spring jaws of Fig. 13.

Referring particularly to Figs. 1 to 8 the suspender cast off is shown to consist of an elongated loop comprising upper bar 23 and lower bar 22 separated by the slot 20. Outwardly curved spring jaws 21 diverging at their lower ends extend from the lower bar 22 and the said jaws are sufficiently separated from each other to allow lateral movements thereof.

On the lower bar 22 is supported the hook portion 25, which has two sustaining arms 26 with eyes 27, and the hook 28 with the bearing 29. A strap 30 is shown supported on bearing 29, and webbing 31 is represented as encircling the upper bar 23.

To assemble the parts of the invention the hook portion is connected with the elongated loop by encircling the lower bar 22, with the eyes 27. The webbing 31 and strap 30 being in place. Then the spring jaws 21 are sprung in place, by forcing them through the opening 32 between the arms of the hook portion, so that the rear ends 33 of the spring jaws will bear on arms 26, and the front legs of each jaw will bear against the turned up inside face 34 of the hook. The jaws can be forced through the opening 32, by reason of yielding laterally in the directions of the arrows as shown in Fig. 4. When the jaws are thus placed in operative position, the lower ends 35 form barriers to the disengagement of the straps 30 from the hook portions.

In Figs. 1 to 8 the elongated loop is shown made of wire, in Figs. 9 to 12, the elongated loop 40 with the jaws 41 is shown of material pressed from sheet metal with the hook portion 42 attached thereto.

In Figs. 13 to 16 the invention is modified by forming the hook portion 50 with the loop 51, the said hook portion extending from the lower bar 52 of the loop, and an opening 53 is formed in the upper end of the hook portion. A pair of spring jaws 54 are hooked over said lower bar with the eye 55, and the loops 56 of the jaws are forced through the said opening 53 in the usual way, as described for the other form of the invention.

Having described my invention, I claim:

1. In a cast off for suspenders the combination of a loop, a hook portion depending therefrom, arms on the hook portion, laterally yielding spring jaws extending from the loop arranged to be forced through an opening between said arms, and to bear between faces of the hook portion.

2. In a cast off for suspenders the combination of a loop, comprising an upper and lower bar, webbing extending from the upper bar, a hook portion suspended from the said lower bar, arms on the hook portion, laterally yielding spring jaws extending from the lower bar arranged to be forced through an opening between said arms and to bear between faces of the hook portion.

3. In a cast off for suspenders the combination of a loop comprising an upper and a lower bar, a hook portion for a strap depending from the lower bar, arms on the hook portion, laterally yielding spring jaws diverging at their lower ends extending from the lower bar arranged to be forced through an opening between said arms, and to bear between faces of the hook portion.

4. In a cast off for suspenders the combination of a loop comprising an upper and lower bar, a hook portion having an opening extending from the lower bar, a pair of spring jaws hooked over the said lower bar and forced through said openings of the hook portion, the jaws arranged to bear between faces of said hook portion.

Signed at New York in the county of New York and State of New York this 6th day of October A. D. 1906.

RUDOLPH F. BARTEL.

Witnesses:
  MYRON H. COOK,
  MARTIN ZIMANSKY.